(12) United States Patent  
Culligan et al.

(10) Patent No.: US 8,355,230 B2  
(45) Date of Patent: Jan. 15, 2013

(54) EXTENDED INSTANTANEOUS PROTECTION

(75) Inventors: John Louis Culligan, Woodstock, GA (US); Ray Montgomery Clark, Snellville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 793 days.

(21) Appl. No.: 11/006,144

(22) Filed: Dec. 7, 2004

(65) Prior Publication Data

US 2005/0122654 A1    Jun. 9, 2005

Related U.S. Application Data

(60) Provisional application No. 60/527,727, filed on Dec. 8, 2003.

(51) Int. Cl.  
*H02H 3/08* (2006.01)

(52) U.S. Cl. ........................................ 361/93.6

(58) Field of Classification Search .................. 361/93.6  
See application file for complete search history.

(56) References Cited

U.S. PATENT DOCUMENTS

| | | | |
|---|---|---|---|
| 3,666,994 A * | 5/1972 | Watson et al. .................. 361/96 |
| 4,245,318 A * | 1/1981 | Eckart et al. .................... 702/67 |
| 4,455,612 A * | 6/1984 | Girgis et al. .................... 700/294 |
| 4,644,438 A | 2/1987 | Puccinelli | |
| 4,733,321 A | 3/1988 | Lindeperg ........................ 361/96 |
| 4,858,054 A * | 8/1989 | Franklin .......................... 361/57 |
| 4,906,967 A * | 3/1990 | Winter ............................ 335/172 |
| 5,434,509 A * | 7/1995 | Blades ............................ 324/536 |
| 5,726,846 A | 3/1998 | Houbre | |
| 5,872,722 A * | 2/1999 | Oravetz et al. ................. 700/292 |
| 5,877,691 A | 3/1999 | Suptitz | |
| 5,956,218 A | 9/1999 | Berthold | |
| 6,295,190 B1 | 9/2001 | Rinaldi | |
| 6,313,639 B1 | 11/2001 | Griepentrog | |
| 6,469,882 B1 * | 10/2002 | Tignor .......................... 361/93.1 |
| 6,633,467 B2 * | 10/2003 | Macbeth et al. ................ 361/42 |
| 6,633,474 B1 | 10/2003 | Boudaud ......................... 361/95 |
| 2003/0090271 A1 * | 5/2003 | Hurwicz ......................... 324/424 |
| 2003/0107380 A1 | 6/2003 | Leprettre | |
| 2003/0156374 A1 | 8/2003 | Edwards et al. ................ 361/94 |

FOREIGN PATENT DOCUMENTS

| | | |
|---|---|---|
| DE | 19811956 A1 | 9/1999 |
| EP | 0929139 | 7/1999 |
| GB | 2073969 A | 10/1981 |

OTHER PUBLICATIONS

PCT International Search Report (PCT/US 2004/041126) Mailed Apr. 6, 2005.

* cited by examiner

*Primary Examiner* — Rexford Barnie  
*Assistant Examiner* — Ann Hoang

(57) ABSTRACT

Certain exemplary embodiments can comprise an apparatus comprising: a current transformer adapted to provide a signal correlated to an amperage of an alternating current of a first phase of an electric circuit, the alternating current flowing through a circuit breaker; and a microprocessor adapted to receive the signal from said current transformer, and to cause the circuit breaker to trip responsive to the signal exceeding a predetermined threshold.

25 Claims, 5 Drawing Sheets

1000

5000

EXTENDED INSTANTANEOUS PROTECTION

CROSS-REFERENCE TO RELATED APPLICATION

This application claims priority to, and incorporates by reference herein in its entirety, pending U.S. Provisional Patent Application Ser. No. 60/527,727, filed 8 Dec. 2003.

BACKGROUND

U.S. Pat. No. 4,644,438 (Puccinelli), which is incorporated by reference herein in its entirety, allegedly recites an "electric current-limiting circuit breaker comprises a pair of separable contacts and a selective solid state trip unit including an actuator cooperating with a latch mechanism for actuating the contacts to a positive open position upon occurrence of an overcurrent condition. The movable contact may also be moved by electrodynamic repulsion towards the open position when the fault current exceeds a predetermined threshold to effect current limiting. A tripping control device has an electronic counter which counts successive opening and closing cycles of the contacts so as to trip mechanism after a given number of cycles. The trip unit further comprises a first time delay tripping circuit, and a second instantaneous tripping circuit which cooperates with the cycle counter so as to ensure either instantaneous tripping or tripping by counting up to a number of cycles preselected on a setting selector." See Abstract.

U.S. patent application No. 20030107380 (Leprettre), which is incorporated by reference herein in its entirety, allegedly recites the "electrical short-circuit detection device comprises first signal processing means receiving a signal representative of an electrical current and supplying a first signal representative of the value of said electrical current and a second signal representative of the differential of said electrical current, and second processing means receiving said signals and comprising short-circuit detection means supplying a detection signal according to a curve overshoot. The second processing means monitor a limit curve overshoot and a ratio between variations of said signals. A short-circuit detection signal is supplied if said ratio exceeds a preset threshold. The circuit breaker incorporates such a device. The process comprises monitoring steps of limit curve overshoot and of the ratio between variations of the signals." See Abstract.

U.S. Pat. No. 5,726,846 (Houbre), which is incorporated by reference herein in its entirety, allegedly recites a "trip device comprises at least one current transformer for supplying power to electronic circuits. The current transformer comprises a magnetic circuit, surrounding a primary conductor, a secondary winding wound onto a part of the magnetic circuit forming a core, and a magnetic shunt branch connected on the magnetic core. The magnetic shunt comprises an air-gap. When the current flowing in the primary conductor is of low value, the magnetic flux stopped by the air-gap flows essentially via the core of the secondary winding. At high current levels the induction is greater and a large part of the magnetic flux passes through the shunt via the air-gap. The current transformer has a non-linear current response which limits excess power supplied to the electronic circuits and dissipated in the transformer. The trip device is useful, for example, in a circuit breaker." See Abstract.

SUMMARY

Certain exemplary embodiments can comprise an apparatus comprising: a current transformer adapted to provide a signal correlated to an alternating current of a first phase of an electric circuit, the alternating current flowing through a circuit breaker; and a microprocessor adapted to receive the signal from the current transformer, and to cause the circuit breaker to trip responsive to the signal exceeding a predetermined threshold.

BRIEF DESCRIPTION OF THE DRAWINGS

A wide variety of potential embodiments will be more readily understood through the following detailed description, with reference to the accompanying drawings in which.

DEFINITIONS

Figure 1:
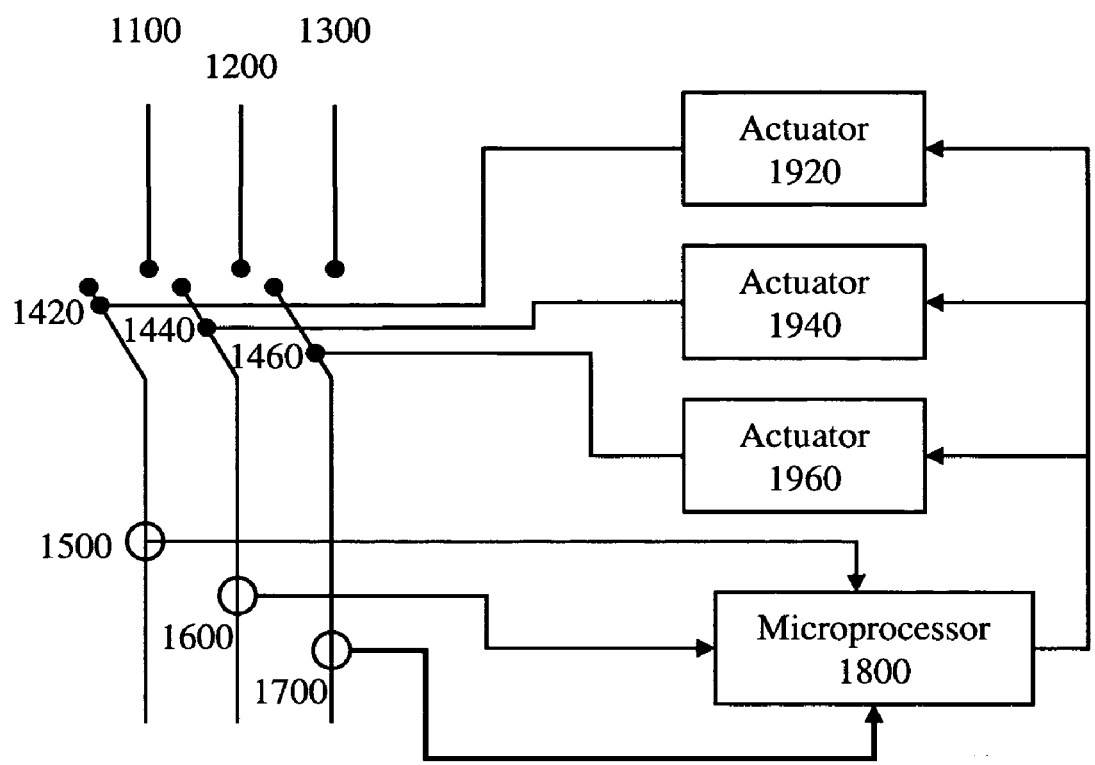
FIG. 1 is a block diagram of an exemplary embodiment of a circuit breaker system 1000.

When the following terms are used herein, the accompanying definitions apply:

alternating current (AC)—an electric current that reverses direction in a circuit at regular intervals.

amp—a unit of measure of a magnitude of an electric current.

amperage—a magnitude of an electric current.

apparatus—device.

approximately—about, nearly.

electric circuit—a system of electrically-connected electrical devices, the system providing a path for electrical energy to flow, i.e., a current path.

circuit breaker—an automatic and/or manual switch that stops the flow of electrical energy in an overloaded or otherwise stressed electric circuit.

control—regulate or cause to act in a predetermined manner.

correlated to—numerically related to.

current—a flow of electrical energy.

current cycle—an amount of time substantially equivalent to a time elapsed for an alternating current to traverse 360 phase degrees. For example, a typical commercially generated electric current in the United States will flow at substantially 60 current cycles per second, which is equivalent to 60 Hertz (Hz).

current transformer—a device electrically and/or magnetically couplable to a electric circuit, the device adapted to output a secondary electrical current in response to the electrical current (the "primary current") in the electric circuit, the secondary current typically a predetermined ratio of the primary current.

downstream branch—a second portion of an electric circuit further distant from a power source than a first portion of the electric circuit.

electrically connected—coupled in a manner adapted to transfer electrical energy.

equal—substantially the same as.

flow—a continuous transfer.

fused—equipped with an electrical fuse adapted to limit an electric current in an electric circuit.

instantaneously—occurring in less than about 1.5 current cycles.

less than—having a measurably smaller magnitude as compared to another value.

magnetic flux tripping device—an actuator adapted to open a circuit breaker, the actuator operated via an electromagnetic control that generates a changing magnetic field.

magnetic latch—an actuator adapted to open or close a circuit breaker, the actuator operated via a magnetic field.

main breaker—an automatic switch at a relative upstream location in an electric circuit. The automatic switch can stop the flow of electric current in one or more overloaded or otherwise stressed electric circuits.

maximum equipment rating—a largest value of a specified continuous electrical parameter for an electrical device.

maximum withstand rating—a largest value of electric current conductible through an electric device without damaging the device.

measure—a quantity ascertained by comparison with a standard.

microprocessor—a device adapted to perform one or more predetermined tasks. In certain embodiments, a processor can act upon information by manipulating, analyzing, modifying, converting, transmitting the information for use by an executable procedure and/or an information device, and/or routing the information to an output device. A microprocessor can be a central processing unit, a local controller, a remote controller, parallel controller, and/or distributed controller, etc. The microprocessor can be a general-purpose microcontroller, such the Pentium IV series of microprocessor manufactured by the Intel Corporation of Santa Clara, Calif. In another embodiment, the microprocessor can be an Application Specific Integrated Circuit (ASIC) or a Field Programmable Gate Array (FPGA) that has been designed to implement in its hardware and/or firmware at least a part of an embodiment disclosed herein.

phase—a measure of an angular relationship between time-varying currents and voltages in an AC circuit.

predetermined—established in advance.

responsive—reacting to an influence and/or impetus.

Rogowski coil—an electrical device for measuring an amplitude of an alternating current (AC). It typically comprises a helical coil of wire with the lead from one end returning through the center of the coil to the other end, so that both terminals are at the same end of the coil. A straight conductor is then inserted through the whole assembly, so that the longitudinal axis of the conductor and the winding axis of the coil are approximately co-axial. A change of current in the straight conductor then induces a proportional voltage in the coil. One potential advantage of a Rogowski coil over other types of induction coils is that it can be made open-ended and flexible, thereby potentially allowing it to be wrapped around a live conductor without disturbing it. Since a Rogowski coil typically has an air core rather than an iron core, it can have a low inductance and can respond to fast-changing currents. Also, because it typically has no iron core to saturate, its response typically is highly linear even when subjected to large currents, such as those used in electric power transmission and welding. A correctly formed Rogowski coil, with equally spaced windings, is typically immune to electromagnetic interference.

signal—detectable transmitted energy that can be used to carry information. Signals can be analog or digital. Signals can be compared to reference values in order to determine relative intensities.

stop—cease or end.

substantially—approximately.

system—a collection of mechanisms, devices, and/or instructions, the collection designed to perform one or more specific functions.

threshold—a point that when exceeded produces a given effect or result.

time period—an interval of time.

tripping circuit—a device or system adapted to switch off a flow of electricity from an electric circuit.

trip—stop a flow of electric energy in an electric circuit by via opening a switch.

tripping—stopping a flow of electric energy in an electric circuit by via opening a switch.

unfused—lacking an electric fuse.

value—an assigned or calculated numerical quantity.

volts—a unit of measurement of electrical potential.

DETAILED DESCRIPTION

A toroidal coil mounted around and in a plane perpendicular to a conductor in which a current flows can be used to measure the current flowing in the conductor. This kind of toroidal coil, which comprises a given number of turns wound onto a dielectric core having a constant or even non-constant cross-section over its length, can be called a "Rogowski coil".

FIG. 1 is a block diagram of an exemplary embodiment of a system 1000 related to a circuit breaker, which can comprise line conductors 1100, 1200, and 1300. Line conductors 1100, 1200, and 1300 can conduct a three-phase alternating current to a connected electric circuit. In certain exemplary embodiments, system 1000 can comprise a circuit breaker and can be associated with an electric circuit adapted to be connected to continuously flowing power. The maximum equipment rating voltage of the circuit breaker can be, for example, about 100, 115, 120.2, 177, 201, 224.8, 230, 306.5, 480, 600, 700, 847, 1,000, 2,400, 10,000, 50,000, 100,000, etc., volts and/or any value or sub-range therebetween.

Circuit breaker system 1000 can comprise switch mechanisms 1420, 1440, 1460, each of which can be dedicated to a particular phase of a three-phase power system. Each of switch mechanisms 1420, 1440, 1460 can be adapted to be controlled by respective actuators 1920, 1940, 1960. In certain exemplary embodiments a single switch mechanism can be used to open all three phases. In certain exemplary embodiments a single actuator can control one or more switch mechanisms. Switch mechanisms 1420, 1440, 1460 can be adapted for relatively fast opening and/or closure. An actuating signal provided to actuators 1920, 1940, 1960 can be responsive to an amperage of an alternating current that is respectively over or under a predetermined threshold for a predetermined period of time.

For extended instantaneous protection, the predetermined threshold can be approximately 95, 96.23, 97.6, 99.999, 100, 100.0001, 101, 107.35, 110.2, 113.993, 119.4999, 120, 122.3, 135, 150, etc. percent, and/or any value or sub-range of values therebetween, of a withstand rating of the circuit breaker. The withstand rating, in amps, of circuit breaker system 1000 can be 50,000; 100,000; 200,000; 300,000; 500,000 amps, or any value or sub-range of values therebetween. For extended instantaneous protection, the predetermined period of time can be a value over approximately 20 electric current cycles, such as for example, 20.005, 21.8, 23, 25.41, 26, 27.994, 28.5, 29, 30.09, 35, 39.362, 40, 49.8, 51,220, 60 current cycles and/or any value or sub-range of values therebetween.

The circuit breaker associated with system 1000 can have any workable structure. System 1000 can be either a single equipment unit that comprises an integrated current limiting function, or can comprise modular components such as a basic circuit-breaker and a current limiting unit.

The amperage of the alternating current in each line conductor 1100, 1200, 1300, of circuit breaker system 1000 can be monitored by current sensors 1500, 1600, and/or 1700, which can be integrated into a circuit breaker case associated with system 1000. Current sensors 1500, 1600, 1700 can be Rogowski coil type current sensors. When implemented with Rogowski coils, sensors 1500, 1600, 1700 can be adapted to provide signals proportional to the flow of current in a respective line conductor 1100, 1300, 1300 at an accuracy of better than approximately one percent. When implemented with Rogowski coils, sensors 1500, 1600, 1700 need not saturate at high current levels that can occur during a short-circuit condition. Signals proportional to the current flow in each line conductor 1100, 1200, 1300 can be sent from current sensors 1500, 1600, 1700 to microprocessor 1800. In certain exemplary embodiments, less than three Rogowski coils can be used to monitor the alternating current flowing through the circuit breaker. Certain exemplary embodiments can use a single Rogowski coil. Certain exemplary embodiments can use two Rogowski coils.

Microprocessor 1800 can be adapted to compare a variable, such as the amperage, power, etc., of the alternating current in each line conductor 1100, 1200, 1300 to a predetermined threshold for that variable. The variable can be measured in any of a number of manners, such as for example, base-to-peak, peak-to-peak, base-to-peak RMS, peak-to-peak RMS, etc. For convenience, the variable will be referred to hereafter as amperage, with the recognition that one or more other variables could possibly be utilized.

Microprocessor 1800 can also detect, obtain, and/or record an amount of time over which the amperage of the alternating current flowing in each line conductor 1100, 1200, and 1300 exceeds a predetermined threshold. Responsive to the amperage of the alternating current exceeding the predetermined threshold for a predetermined period of time, the microprocessor can initiate a tripping command that can be sent to actuators 1920, 1940, 1960. Microprocessor 1800 can be adapted to prevent switch mechanisms 1420, 1440, 1460 from opening (or tripping) if the amperage of the alternating current is less than or equal to approximately 100 percent of the maximum withstand rating of the circuit breaker for a time period of less than a predetermined time period, such as approximately 20, 30, 41, etc., current cycles, including all values and sub-ranges therebetween.

Actuators 1920, 1940, 1960 can operate by electrodynamic or electromagnetic effects. In certain exemplary embodiments, actuators 1920, 1940, 1960 can comprise a magnetic latch. In certain exemplary embodiments, actuators 1920, 1940, 1960 can comprise a magnetic flux tripping device.

Figure 2:
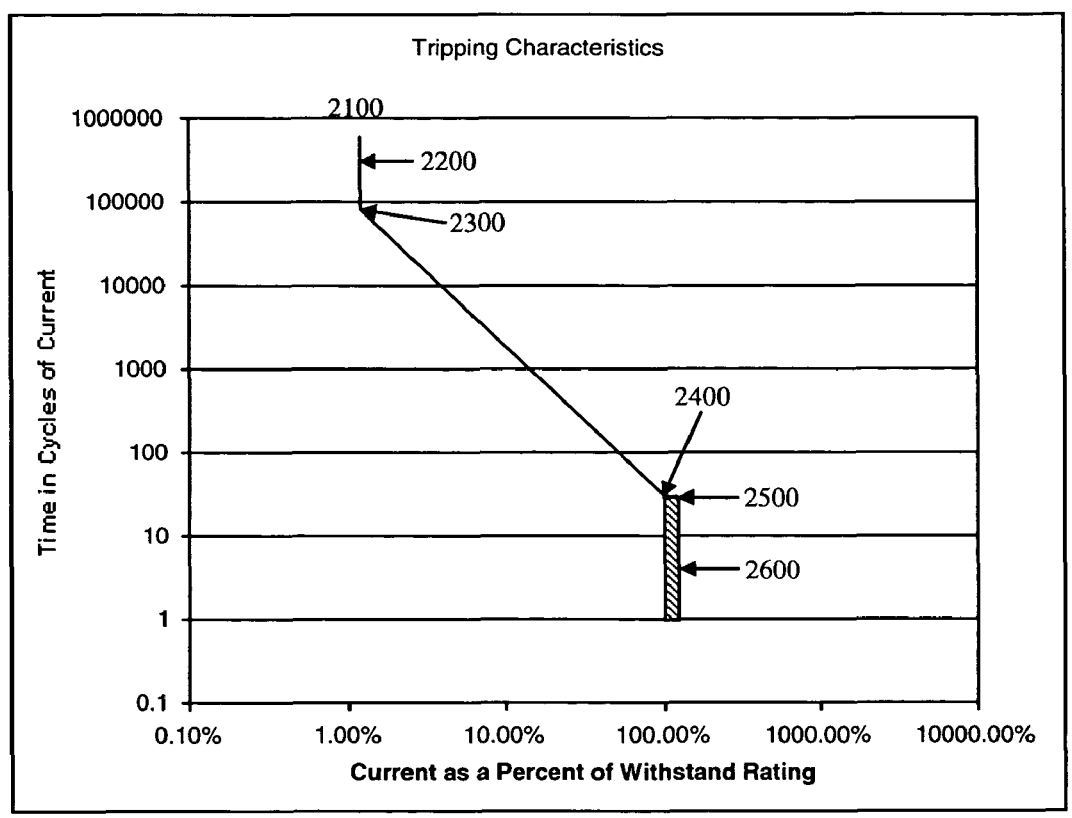
FIG. 2 is an exemplary graph of electrical circuit breaker tripping characteristics 2000.

FIG. 2 is an exemplary graph of electrical circuit breaker tripping characteristics 2000, which comprises a tripping curve 2100 that characterizes circuit breaker operation. Tripping curve 2100 can be plotted on a logarithmic by logarithmic scale as illustrated. Tripping curve 2100 can define a continuum of points that illustrate the tripping characteristics of a circuit breaker. The region to the right of tripping curve 2100 represents all points at which the circuit breaker is open and therefore does not allow current flow through the circuit. The region to the left of tripping curve 2100 represents all points at which the circuit breaker remains closed and allows current flow through the circuit. Tripping curve 2100 can comprise four distinguishable segments, each defined by a pair of points. A first segment can be defined by a point 2300 and any other point on a line vertically above point 2300 with respect to time, such as point 2200. The area to the left of the first segment can define a continuum of points at which electric current can flow continuously through the circuit, for an indefinite period of time, without tripping the circuit breaker. If a circuit current is approximately equal to that defined by point 2300 for a time approximately equal to that defined by point 2300, the breaker can trip.

A second segment can be defined by point 2300 and point 2400. For the second segment, if the circuit's amperage is approximately equivalent to a value on the second segment or greater for the associated time or greater, the circuit breaker will be tripped. In certain exemplary embodiments, point 2400 can define an amperage of approximately 100% of a withstand rating of the circuit breaker.

A third segment can be defined by a line between point 2400 and point 2500. This segment can be called the extended instantaneous protection segment. The crosshatched area of FIG. 2 defines an extended instantaneous protection region. The crosshatched area is defined by current value boundaries associated with point 2400 and 2500 respectively and an upper time value boundary approximately equal to the time value associated with point 2400 and point 2500. Within the crosshatched area, a control system associated with the circuit breaker can extend the tripping of the circuit breaker to an amperage beyond the withstand rating of the breaker for a limited time period, and instantaneously trip the breaker at amperages beyond the extended current value. Thus, this attribute can be referred to as extended instantaneous protection of the circuit breaker.

In certain exemplary embodiments, point 2400 can define an amperage of approximately 100% of a withstand rating of the circuit breaker. Point 2500 can define an amperage of approximately 120% of a withstand rating of the circuit breaker. When current values flow in the circuit within the continuum of values within the extended instantaneous protection segment, the control system can delay the tripping of the circuit breaker until the time value associated with point 2400 and point 2500 is approximately reached. In certain exemplary embodiments, the time value associated with point 2400 and point 2500 can be approximately 20 to approximately 40 current cycles, including all values and subranges therebetween.

A fourth segment of tripping curve 2100 can be defined by point 2500 and any point vertically below point 2500 with respect to time, such as point 2600. The fourth segment can be called a substantially instantaneous trip segment. At amperage levels at or above that defined by point 2500, the circuit breaker can be adapted to trip in a time period of less than approximately two alternating current cycles, such as approximately 0.1, 0.24, 0.5, 1.03, 1.47, etc. cycles, including all values and subranges therebetween.

Controlling a circuit breaker using extended instantaneous protection can allow a circuit breaker to operate without a substantially instantaneous trip that is below the withstand rating. Extended instantaneous protection can provide a means for coordinating electrical device trips in a power distribution system. A main breaker can be equipped with extended instantaneous protection to trip when the amperage of the alternating current exceeds the withstand rating for a time period in excess of a predetermined number of electric current cycles. Feeder breakers receiving power via the main breaker can be adapted to trip when the electric current is less than or equal to the withstand rating for a time period of less than the predetermined number of electric current cycles, thereby allowing circuits in which an electrical short or fault exists downstream of the main circuit breaker to lose power as a result of the short or fault, while current continues to flow to other downstream circuits with no electrical short or fault. Electrical reliability can be increased by designing and/or constructing main circuit breakers with relatively high withstand ratings and trip times coordinated to exceed those of downstream breakers.

Extended instantaneous protection can provide protection in the event that an available fault current increases at some time during the life of a designed power distribution system beyond a withstand level related to that system. This can be due to a utility transformer change but could also be due to the addition of generators or large motors that contribute to potential fault currents.

Extended instantaneous protection enables the circuit breaker to be applied up to the full interrupting rating of the circuit breaker on systems where the available fault current exceeds the withstand rating. Extended instantaneous protection can improve power transmission reliability in an electric circuit.

Figure 3:
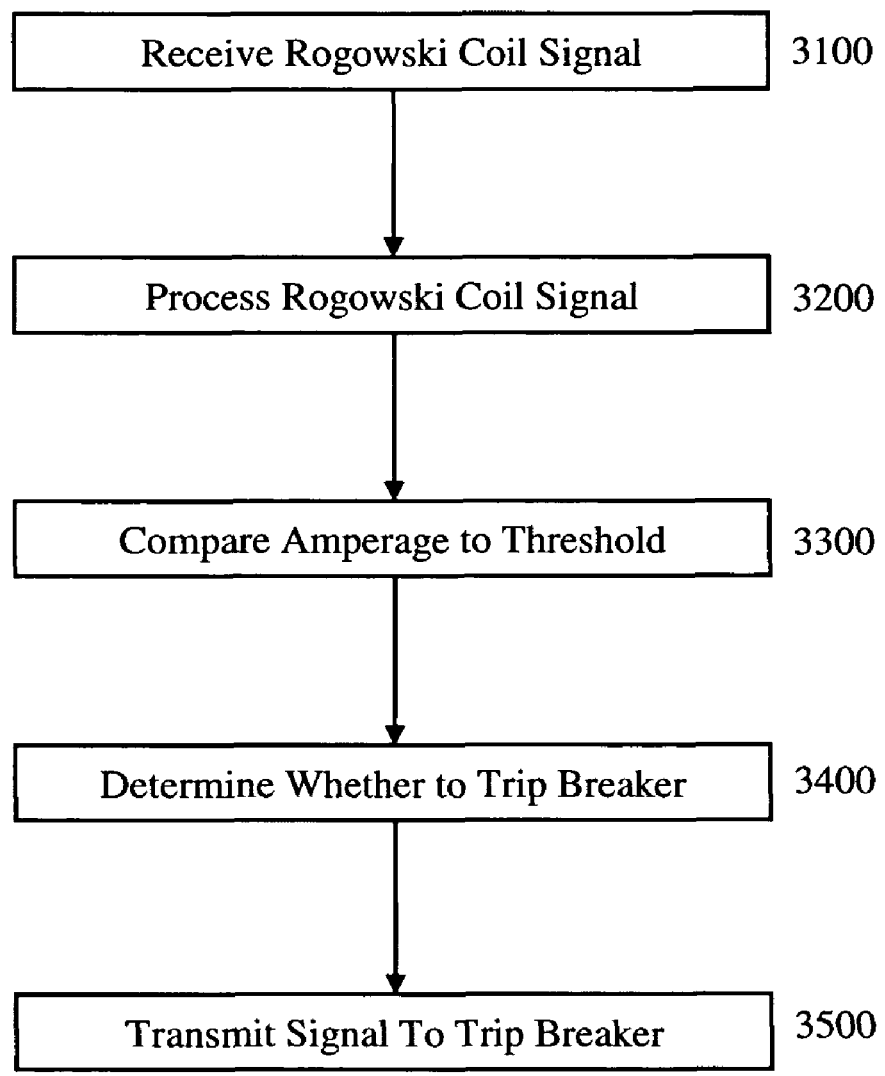
FIG. 3 is a flow diagram of an exemplary embodiment of a circuit breaker tripping method 3000.

FIG. 3 is a flow diagram of an exemplary embodiment of a circuit breaker tripping method 3000. At activity 3100, a signal can be received, at a microprocessor or an information device, from a Rogowski Coil current transformer. The signal can be proportional to an amperage of an alternating current flowing through a conductor associated with the Rogowski coil.

At activity 3200, the microprocessor or information device can process the Rogowski coil signal. For example, the Rogowski coil signal can be converted from an analog signal to a digital representation of the amperage of the alternating current flowing through the conductor associated with the Rogowski coil.

At activity 3300, the microprocessor can compare the amperage of the alternating current flowing through the conductor associated with the Rogowski coil to a predetermined threshold. The predetermined threshold can be, for example, a value between 100% and 120% of the withstand rating of a circuit breaker associated with the conductor associated with the Rogowski coil. The microprocessor can also track a time interval over which the signal has exceeded the predetermined threshold and compare the time interval to a predetermined time interval.

At activity 3400, the microprocessor or information device can determine whether to trip the circuit breaker. The microprocessor can determine whether or not to trip the circuit breaker responsive to the amperage of the alternating current flowing through the conductor associated with the Rogowski coil exceeding a predetermined threshold for a predetermined period of time.

At activity 3500, microprocessor can transmit a signal to trip the circuit breaker. In certain exemplary embodiments, the signal to trip the circuit breaker can be sent to an actuator adapted to open a switch associated with the circuit breaker to arrest current flow to an electric circuit connected thereto.

Figure 4:
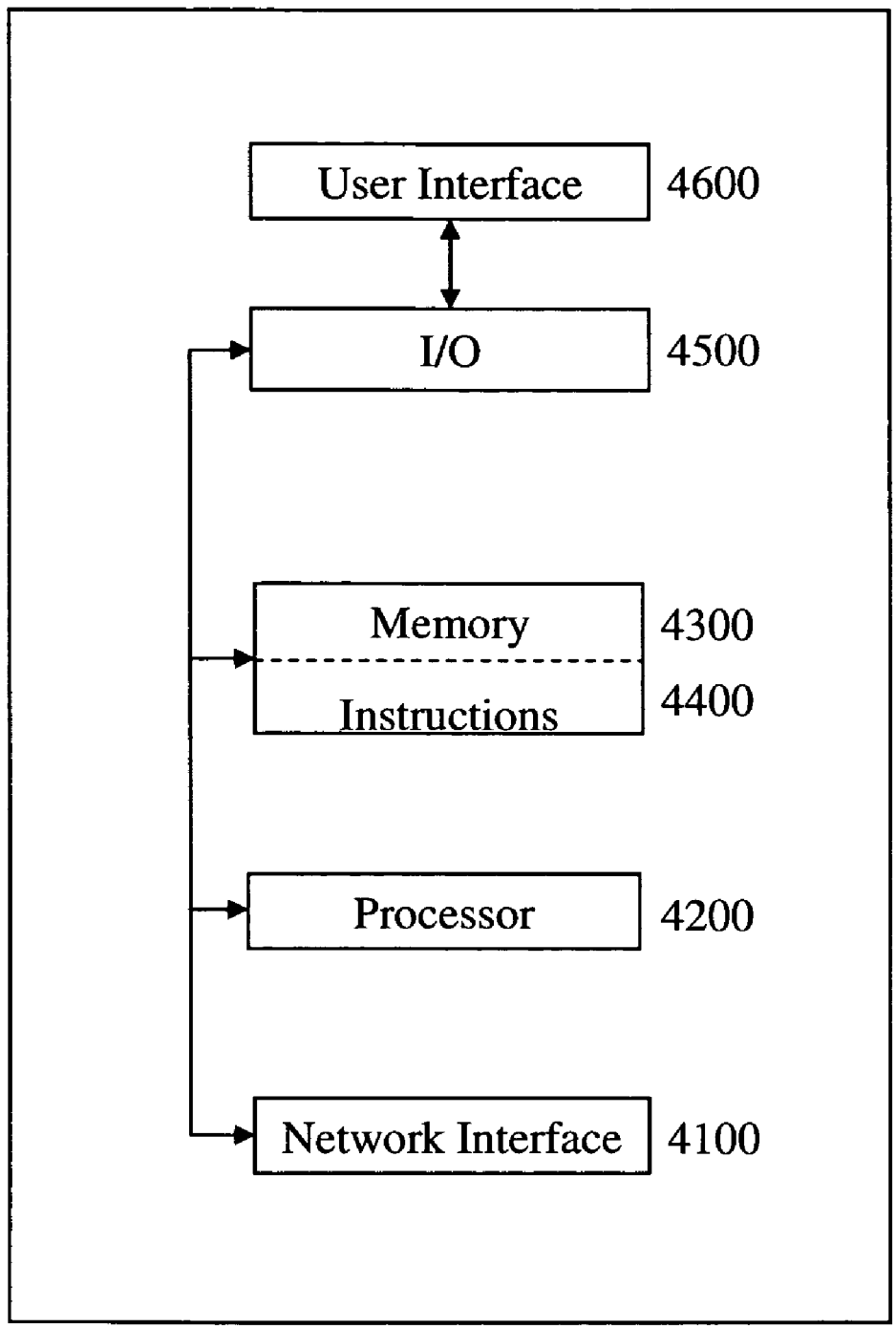
FIG. 4 is a block diagram of an exemplary embodiment of an information device 4000.

FIG. 4 is a block diagram of an exemplary embodiment of an information device 4000, which in certain operative embodiments can comprise, for example, a device comprising microprocessor 1800 of FIG. 1. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can input information related to the circuit breaker, such as tripping values up to a maximum withstand rating of the circuit breaker.

Figure 5:
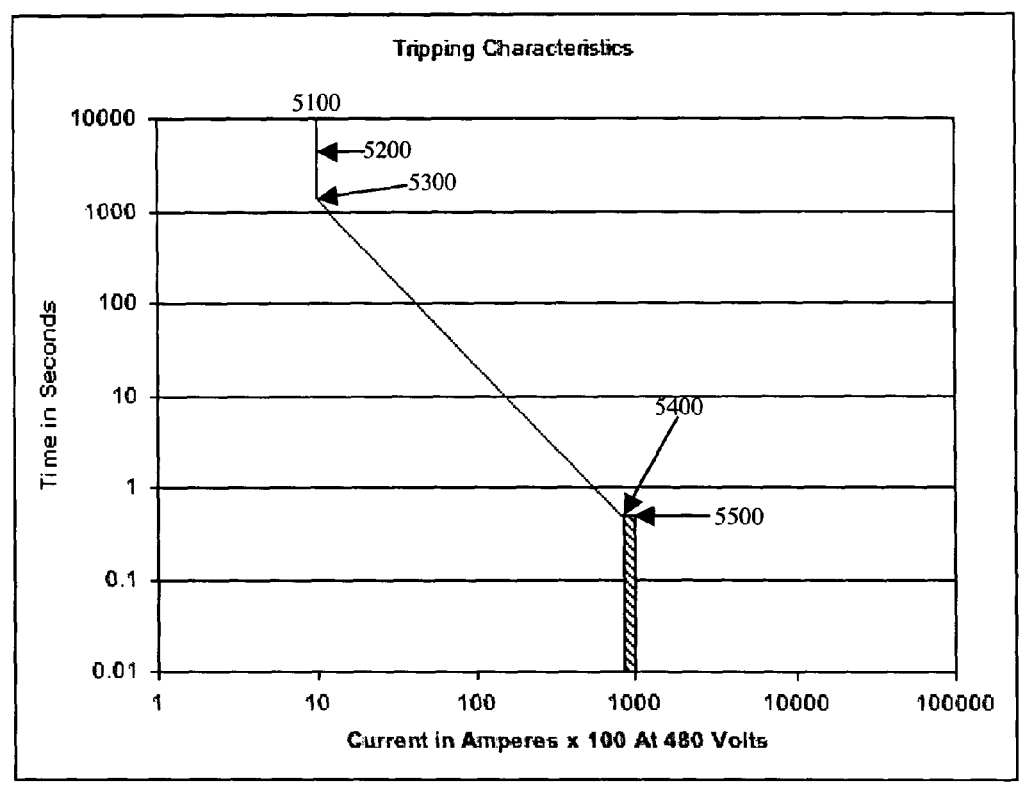
FIG. 5 is a tripping characteristics graph 5000 of data collected for a tested electrical circuit breaker.

FIG. 5 is a tripping characteristics graph 5000 of data collected for a tested electrical circuit breaker. Graph 5000 comprises a tripping curve 5100. Tripping curve 5100 is associated with a particular operative embodiment. A first segment of tripping curve 5100 can be defined by point 5200 and point 5300. A circuit breaker characterized by this particular tripping curve 5100 can open to stop current flow responsive to an alternating current flow is approximately 1000 amps flowing through the circuit breaker for a period of time in excess of approximately 1400 seconds.

A second segment of tripping curve 5100 can be defined by points 5300 and 5400. The second segment provides that the electric circuit breaker will trip, or in other words stop current flow through the circuit breaker, responsive to a threshold value that decreases as an amount of time during which current flow in the electric circuit exceeds the threshold increases. For example, circuit breakers associated with this particular embodiment, as characterized by tripping curve 5100, will trip if a current flow is approximately 83,000 amps for a period of over only approximately 0.5 seconds, but will trip if the current flow is approximately 1,000 amps only after a much longer period of approximately 1400 seconds. Thus, the tripping threshold in the long-time delay region can progressively decrease with an increase in the duration of time to which a particular amount of current, associated with a point on the long time delay segment, flows through the circuit breaker.

A segment between points 5400 and 5500 defines an extended instantaneous protection segment of tripping curve 5100. The current value at which extended instantaneous protection applies can be related to the withstand rating of the circuit breaker. In certain exemplary embodiments, the value of the withstand rating can be approximately equal to the amperage value defined by point 5400. The amperage value defined by point 5500 can be approximately 120% of the withstand rating of the circuit breaker associated with tripping curve 5100. This particular operative embodiment has a withstand rating of approximately 85,000 amps. In this particular embodiment, the circuit breaker waits, when the amperage of the alternating current is between 85,000 and 100,000 amps, for a period of time of greater than approximately 0.5 seconds to trip the circuit breaker associated with tripping curve 5100. Waiting for a period of time greater than approximately 0.5 seconds can allow coordinated downstream circuit breakers to trip on overload and clear a short-circuit seen by the circuit breaker characterized by tripping curve 5100.

In the embodiment defined by tripping curve 5100, a substantially instantaneous trip segment is defined by the line extending down from point 5500. The circuit breaker in this embodiment will trip substantially instantaneously if the current exceeds approximately 100,000 amps. In certain exemplary embodiments, the substantially instantaneous trip can cause the circuit breaker to trip when a current is detected that exceeds about 120 percent of the withstand rating of the circuit breaker for more than about 1 electric current cycle.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. An apparatus comprising:
   a Rogowski coil current transformer adapted to provide a signal correlated to an amperage of an amperage of an alternating current of a first plane of an electric circuit, the alternating current flowing through a circuit breaker; and
   a microprocessor adapted to receive the signal from said Rogowski coil, and to cause the circuit breaker to trip of the amperage is between approximately 100 percent and approximately 120 percent of a maximum withstand rating of the circuit breaker for a time period of no less than approximately 30 current cycles.

2. The apparatus of claim 1, wherein:
   said microprocessor is adapted to prevent the circuit breaker from instantaneously tripping if the amperage is less than or equal to 100 percent of the maximum withstand rating.

3. The apparatus of claim 1, wherein:
   said microprocessor is adapted to cause the circuit breaker to substantially instantaneously trip if the amperage is greater than 120 percent of the maximum withstand rating.

4. The apparatus of claim 1, wherein the circuit breaker has a maximum equipment rating of from about 100 alternating current volts to about 1000 alternating current volts.

5. The apparatus of claim 1, wherein the circuit breaker has a maximum equipment rating of about 700 alternating current volts.

6. The apparatus of claim 1, wherein the circuit breaker has a maximum withstand rating of approximately 50,000 amps.

7. The apparatus of claim 1, wherein the circuit breaker has a maximum withstand rating of approximately 100,000 amps.

8. The apparatus of claim 1, wherein the circuit breaker has a maximum withstand rating of approximately 150,000 amps.

9. The apparatus of claim 1, wherein the circuit breaker has a maximum withstand rating of approximately 200,000 amps.

10. The apparatus of claim 1, wherein the circuit breaker is unfused.

11. The apparatus of claim 1, wherein the apparatus comprises the circuit breaker.

12. The apparatus of claim 1, wherein the apparatus does not comprise the circuit breaker.

13. The apparatus of claim 1, wherein the circuit breaker has no instantaneous tripping function up to 120% of the withstand rating.

14. The apparatus of claim 1, wherein the signal from the Rogowski coil indicates that the amperage of the first phase of the electric circuit is between approximately 100 percent and approximately 105 percent of the maximum withstand rating of said circuit breaker.

15. A system comprising:
    a circuit breaker adapted to stop current flow in an electronic circuit responsive to a control signal;
    a Rogowski coil current transformer adapted to provide a signal correlated to an amperage of an alternating current of a first phase of the electric circuit, the alternating current flowing through the circuit breaker; and
    a microprocessor adapted to receive the signal from said Rogowski coil, and to send the control signal to the circuit breaker if the amperage is between approximately 100 percent and approximately 120 percent of a maximum withstand of the circuit breaker for a time period of no less than approximately 30 current cycles.

16. A method comprising:
    receiving, at a microprocessor and from a Rogowski coil, a first signal to an amperage of a current in an electric circuit, the electric circuit electrically connected to a circuit breaker;
    transmitting a second signal from the microprocessor if the amperage is between approximately 100 percent and approximately 120 percent of a maximum withstand rating of the circuit breaker for a time period of no less than approximately 30 current cycles, the second signal adapted to trip the circuit breaker to stop current flow in the electric circuit.

17. The method of claim 16, further comprising:
    upon receipt of the second signal, actuating a magnetic latch comprised in the circuit breaker.

18. The method of claim 16, further comprises:
    upon receipt of the second signal, actuating a magnetic flux tripping device comprised in the circuit breaker.

19. The method of claim 16, further comprising:
    processing the first signal to determine whether to trip the circuit breaker.

20. The method of claim 16, further comprising:
    determining that the amperage is between approximately 100 percent and approximately 120 percent of the maximum withstand rating of the circuit breaker for the time period of no less than approximately 30 current cycles.

21. The method of claim 16, wherein the current has a frequency of approximately 60 Hz.

22. The method of claim 16, further comprising:
    configuring said microprocessor to trip the circuit breaker according to a tripping curve.

23. The method of claim 16, further comprising:
    configuring said microprocessor to trip the circuit breaker according to a tripping curve that comprises four distinct substantially linear segments when graphed on a logarithmic by logarithmic graph having an abscissa of amperage as a percentage of the withstand rating of the circuit breaker and an ordinate of time cycles of current, wherein a long-term pickup segment of said four distinct substantially linear segments is an approximate vertical line on said graph, said long-term pickup segment defining no points indicative of a current flow greater than approximately 10 percent of the withstand rating of the circuit breaker.

24. The method of claim 16, further comprising:
configuring said microprocessor to trip the circuit breaker according to a tripping curve that comprises four distinct substantially linear segments when graphed on a logarithmic by logarithmic graph having an abscissa of amperage as a percentage of the withstand of the circuit breaker and an ordinate of time cycles of current, wherein a segment of said four distinct substantially linear segments is an approximate straight non-vertical line on said graph, said segment defining at least some points indicative of a current flow level of less than approximately 100 percent of the withstand rating of the circuit breaker.

25. The method of claim 16, wherein the circuit breaker suppresses an instantaneous tripping function until a current flow level of greater than approximately 100% of the withstand rating of the circuit breaker.

* * * * *